United States Patent [19]

Abe et al.

[11] 4,422,756

[45] Dec. 27, 1983

[54] COPYING MACHINE

[75] Inventors: Shunichi Abe; Mitsuo Akiyama, both of Hachioji, Japan

[73] Assignee: Konishiroku Photo Industry Co., Ltd., Tokyo, Japan

[21] Appl. No.: 286,196

[22] Filed: Jul. 23, 1981

[30] Foreign Application Priority Data

Aug. 20, 1980 [JP] Japan ............................ 55-113479

[51] Int. Cl.³ ............................ G03B 27/34

[52] U.S. Cl. ............................ 355/57; 355/8

[58] Field of Search ............................ 355/57, 51, 65, 66, 355/8

[56] References Cited

U.S. PATENT DOCUMENTS 4,154,524 5/1979 Hattori ............................ 355/8

4,211,482 7/1980 Arai et al. ............................ 355/8

4,270,857 6/1981 Komori et al. ............................ 355/8

*Primary Examiner*—Monroe H. Hayes

*Attorney, Agent, or Firm*—Jordan B. Bierman; Linda Bierman

[57] ABSTRACT

During original document scanning, the forward clutch effects scanning travel of the optics unit in a copying machine having user selectable modes for magnification copying and is normally disengaged by detection of the trailing edge of a transfer sheet being transported through the machine; the return clutch for reverse optics unit travel is simultaneously actuated by detection of the sheet's trailing edge to return the optics unit to its original position. In the event that the trailing edge is not detected before expiration of a predetermined time period corresponding to maximum permissable forward travel of the optics unit for the selected magnification mode, the forward clutch is immediately disengaged, although the return clutch is not engaged until the sheet's trailing edge is subsequently detected.

6 Claims, 7 Drawing Figures

COPYING MACHINE

BACKGROUND OF THE INVENTION

1. Field of the Invention

The present invention relates to a copying machine in which the magnifying power for copying may be varied, and more particularly to improvements of the control section thereof for driving an original-scanning optics unit.

2. Description of the Prior Art

A variable magnification type copying machine will first be explained with reference to FIGS. 1 to 3.

In FIG. 1, an optics unit 3 is disposed above a photosensitive drum 2 and is driven in the direction of the reference arrow to scan originals placed on a document glass plate 2. An original image is thereby focussed on the surface of photosensitive drum 1 by optics unit 3, and the electrostatic latent image is then developed with toners while passing through a development device 4. The toner image on the surface of photosensitive drum 1 is next transferred onto transfer paper X fed from paper feeding device 5, and is then conveyed to fixing device 7 by conveyance device 6. Paper feeding device 5 includes paper feeding rollers 9*a* and 9*b* which draw individual sheets of transfer paper X from cassette 8*a* or 8*b*, respectively and, having been drawn into the passageway for feeding papers, the transfer sheets are received through paper registration roller 10. Momentary-stop detector 11 is provided in the paper feeding passage to detect the front and rear ends of transfer paper X. A paper ejecting detector 13 is similarly provided in paper ejecting roller device 12 to detect the rear or trailing end of transfer paper X.

The optics unit 3 for slit exposure of an original to light is equipped with a primary movable table 16 carrying an exposure lamp 14 and primary mirror 15. The light reflected from primary mirror 15 is made incident upon a lens 20 through secondary mirror 18 and tertiary mirror 19 of a secondary movable table 17, table 17 being synchronously moved with primary movable table 16 at one-half the moving speed of table 16. Lens 20 focuses the original image onto the surface of photosensitive drum 1 through a quaternary mirror 21. In addition, an initial position detector 22—for detecting the initial position of optics unit 3—and paper feeding start detector 23—to start the rotation of paper registration roller 10—are provided in the movement locus of a cam 16A of primary movable table 16.

FIG. 2 illustrates the structure of the control section for driving optics unit 3, wherein a driving drum 24, by which primary movable table 16 and secondary movable table 17 are reciprocated, is driven by a connecting member such as chain 26 which is, in turn, driven by a driving device such as motor 25. Thus, optics unit 3 is driven by a driven device through the medium of a connecting member. A forward clutch 27 and a return clutch 28 are interposingly provided, between driving drum 24 and chain 26, to switch the direction of rotation of driving drum 24. Forward clutch 27 is arranged for engagement by the copy start signals and is disengaged by the rear or trailing edge detecting signals from momentary-stop detector 11; return clutch 28 is arranged for engagement by the rear edge detecting signals from momentary-stop detector 11 and is disengaged by the initial position return signals from initial position detector 22.

FIG. 3 illustrates a position adjustment mechanism for lens 20, wherein a lens board 29 carrying lens 20 is movable along the double-headed reference arrow by an auxiliary motor 30 actuated by command from an actuation mode selecting button selected by an operator. A plurality of lens position detectors 31, 32 and 33 are disposed to sense the position of lens board 29 and to detect whether the position of board 29 corresponds to a designated actuation mode.

In the variable magnification type copying machine thus far disclosed, the distance of forward movement of optics unit 3 is to be determined by the time period extending from when paper registration roller 10 starts to rotate and concluding when momentary-stop detector 11 detects the rear edge of transfer paper X. This advantageously assures that any necessary distance of forward movement—irrespective of copy magnifying power—and the time required for continuous copying, are shortened. In addition, the control circuit and program can be simplified more than those used in other kinds of machines, wherein the distance of forward movement of the optics unit is designed in accordance with the selected actuation mode thereof. Where a magnification type copying machine is designated for reduction copying, there is no problem, though, if transfer paper of a size appropriate for receiving the reduced original image is used; there are, however, instances where it is required to obtain copies reduced in size on a portion of a sheet of transfer paper having an unnecessarily larger size. Where, for example, a copying machine is designed to use both transfer paper and originals of A-3 size and also to provide a reduction ratio of 0.71, the length of the document glass plate 2 is 420 mm (which is the same as the length of A-3 size that will do), but the distance of forward movement of the optics unit 3 extends for approximately 591 mm and the copying machine therefore becomes very large in size.

There are also instances in which an operator may utilize transfer paper of which only the length is extraordinarily long and, when such extraordinary size papers are used, problems can develop in that the driving section of the optics unit may cause some damage in the general machine construction heretofore illustrated and described.

SUMMARY OF THE INVENTION

It is therefore an object of the invention to provide a variable magnification type copying machine, wherein reciprocative movement of the optics unit for slit exposure of an original to light is controlled in accordance with detection of the rear ends of transfer sheets by a detector positioned in a paper feeding passageway, without making the dimension of transfer paper larger than necessary, and such that extraordinarily-large size paper can be used.

According to the present invention, this object is achieved in a copying machine capable of variable magnification and which includes a detecting device in the paper feeding passage for detecting the rear end of a fed sheet, a forward clutch which disengages the optics unit upon detection of the rear end of the fed sheet by said detecting device, and a return clutch which engages the optics unit on detection of the rear end of the sheet by said detecting device. The apparatus further includes a controlling device for determining the maximum permissable distance of forward movement of the optics unit in accordance with the selected actuation mode, and a device for disengaging the forward clutch and engaging the return clutch on detection by said detecting device of the rear end of the fed sheet before the optics unit reaches its point of maximum permissable travel, and additionally for disengaging the forward clutch when said detecting device fails to detect the rear end of the sheet by the time the optics unit reaches its point of maximum forward travel, and then engaging the return clutch when the detecting device subsequently detects the sheet's rear end.

DETAILED DESCRIPTION OF THE PREFERRED EMBODIMENTS

The present invention shall now be explained by reference to the examples illustrated in FIGS. 4 to 7.

Figure 4:
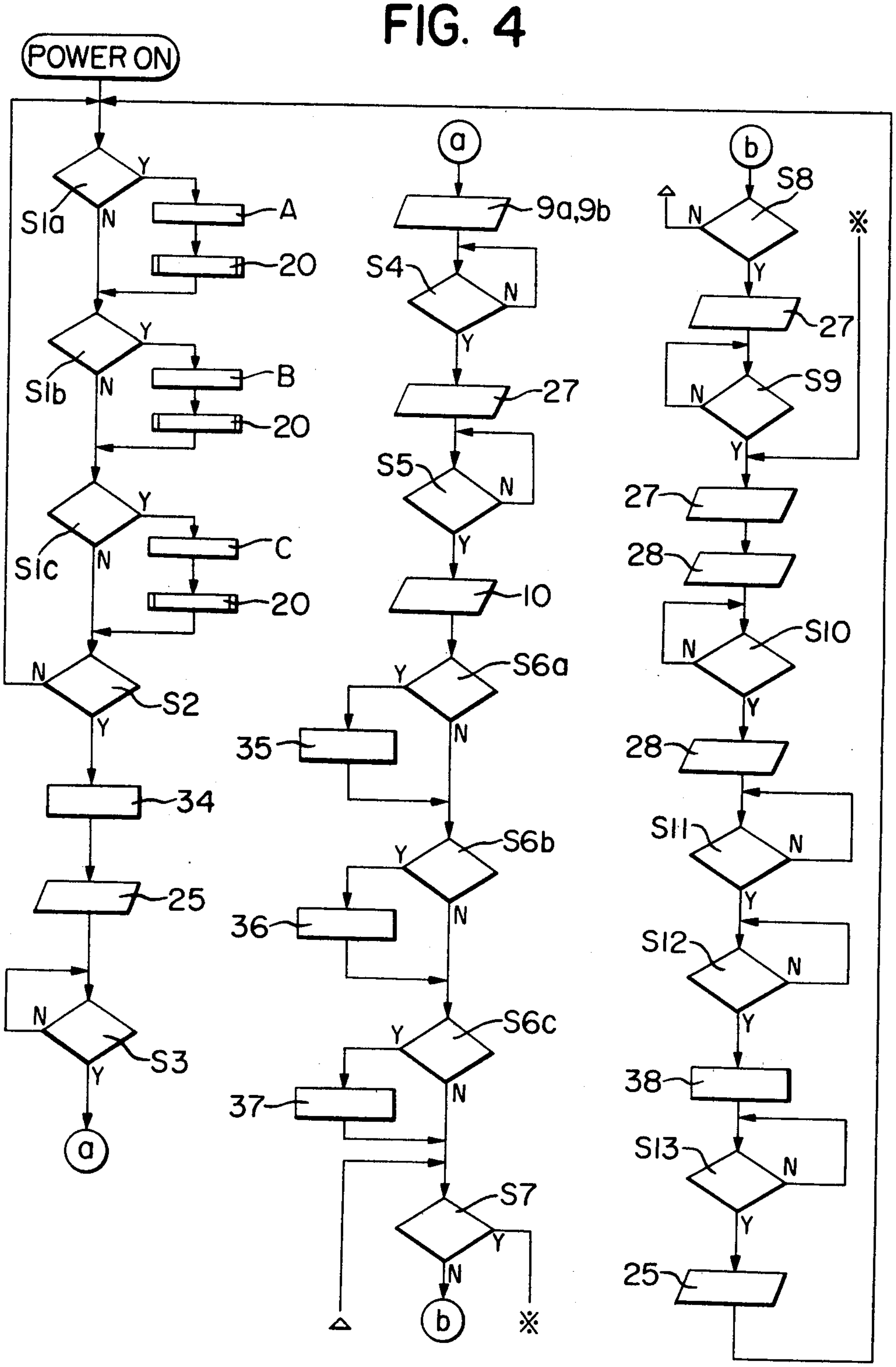
FIG. 4 is a control or flow diagram illustrating the operation of a first example of the invention.

FIG. 4 is a flow or control diagram for an electrophotographic copying machine based on the invention and controlled by a microcomputer. Confirmation is first made as to which actuation mode button (among those for real size copying, primary reduction copying and secondary reduction copying) has been selected by the operator, at steps S1*a*, S1*b* and S1*c* and, according to the results of said confirmation, the corresponding actuation mode—i.e., real size flag A, primary reduction flag B or secondary reduction flag C—is placed in the microcomputer memory. Auxiliary motor 30 is then started in motion, whereby lens 20 is moved to the position designated by the selected actuation mode. At step S2, a determination is made as to whether the copy-start button has been operated and, if so, preset-counter 34 (driven by timing pulses from the computer) is set, and driving motor 25 is started in motion to preliminarily rotate photosensitive drum 1. After a time delay determined by preset counter 34 has passed (step S3), one of the paper feeding rollers 9*a* or 9*b* is rotated to feed a sheet of transfer paper X. When transfer paper X is detected (at step S4) by momentary-stop detector 11, forward clutch 27 is engaged, forward movement of optics unit 3 commences, paper registration roller 10 begins its rotation upon actuation (at step S5) of paper feeding start detector 23, and transfer paper X is thereby carried forward concurrently with optics unit 3.

Thus, each process—i.e. image development, transfer and fixing—can be sequentially carried out. The previously stored real size flag A, primary reduction flag B or secondary reduction flag C is read out in steps S6*a*, S6*b* or S6*c*, respectively and then, according to the selected actuation mode, the appropriate preset counter 35, 36 or 37 is initiated to count timing pulses input from the computer. The respective preset value of each counter 35, 36 and 37 corresponds to the maximum permissable time for continued forward movement of the optics unit 3 in that actuation mode. Step S7 presents a test as to whether the rear end of transfer paper X has yet been detected by momentary-stop detector 11 and, when detected, forward clutch 27 is disengaged and return clutch 28 is immediately engaged to thereby return optics unit 3 to its initial position. Should the rear end of transfer paper X have not been detected, a determination (at step S8) is made as to whether the appropriate preset counter 35, 36 or 37, having been initialized at step S6*a*, S6*b* or S6*c*, has yet completed its count and, if so, forward clutch 27 is disengaged and forward movement of optics unit 3 is immediately stopped. Return clutch 28, on the other hand, is not engaged until subsequent detection (at step S9) of the rear end of transfer paper X by means of momentary-stop detector 11.

The direction of movement of optics unit 3 is thereby reversed and, when primary movable table 16 returns to its original position, initial position detector 22 is actuated (at step S10), return clutch 28 is disengaged, and optics unit 3 is then stopped. Confirmation is then sought through activation of paper ejecting detector 13 (at step S11) that transfer paper X has properly completed its passage, and when the rear end of transfer paper X is detected by detector 13, a preset counter 38 (actuated by timing pulses from the computer) is set, and driving motor 25 is stopped by the action (at step S13) of preset counter 38 upon completion of its counting cycle after a predetermined period of time has passed.

Figure 1:
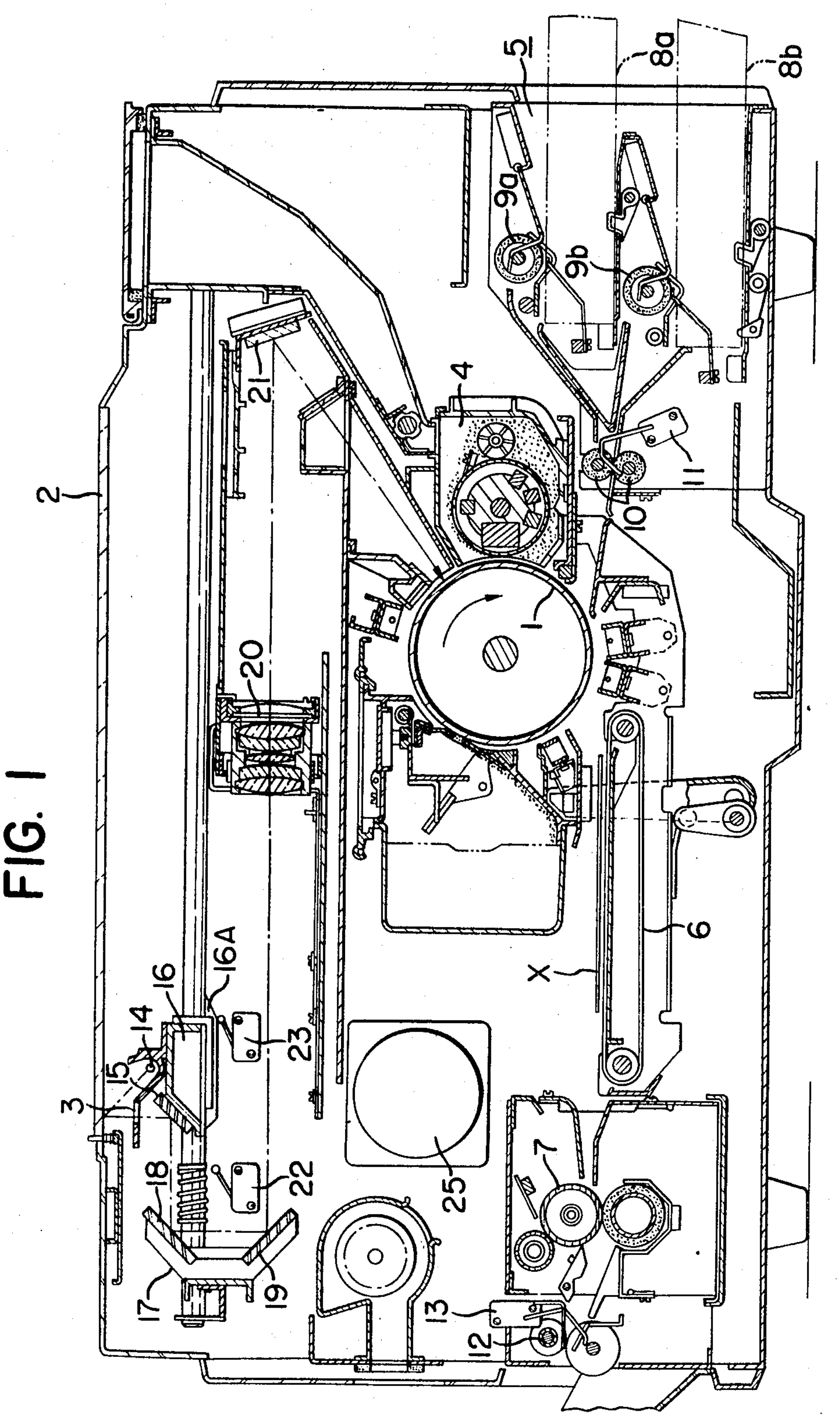
FIG. 1 is a cross-sectional view of a variable magnification type copying machine embodying the present invention.
Figure 2:
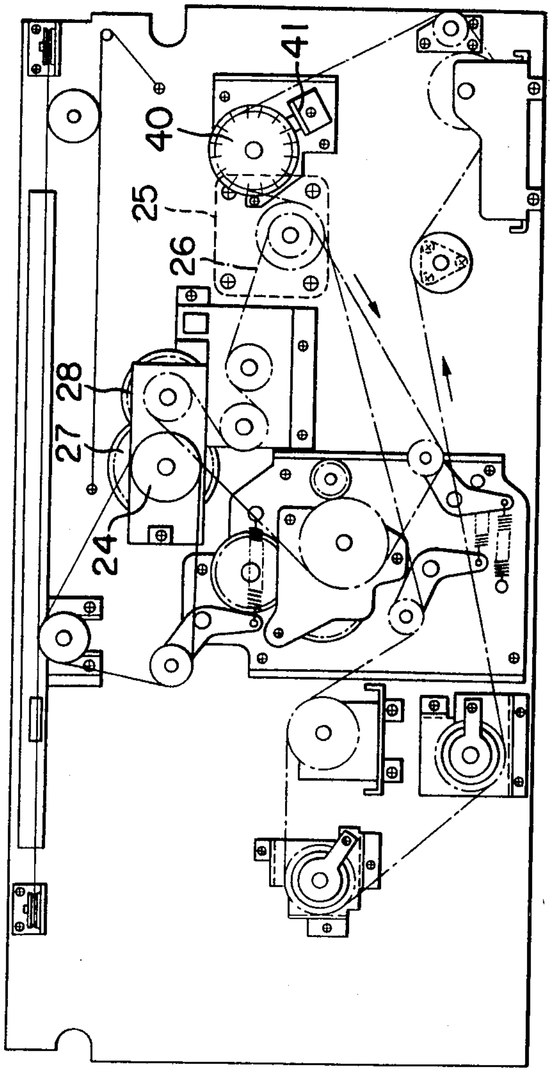
FIG. 2 is a side view of the driving system of the copying machine.
Figure 3:
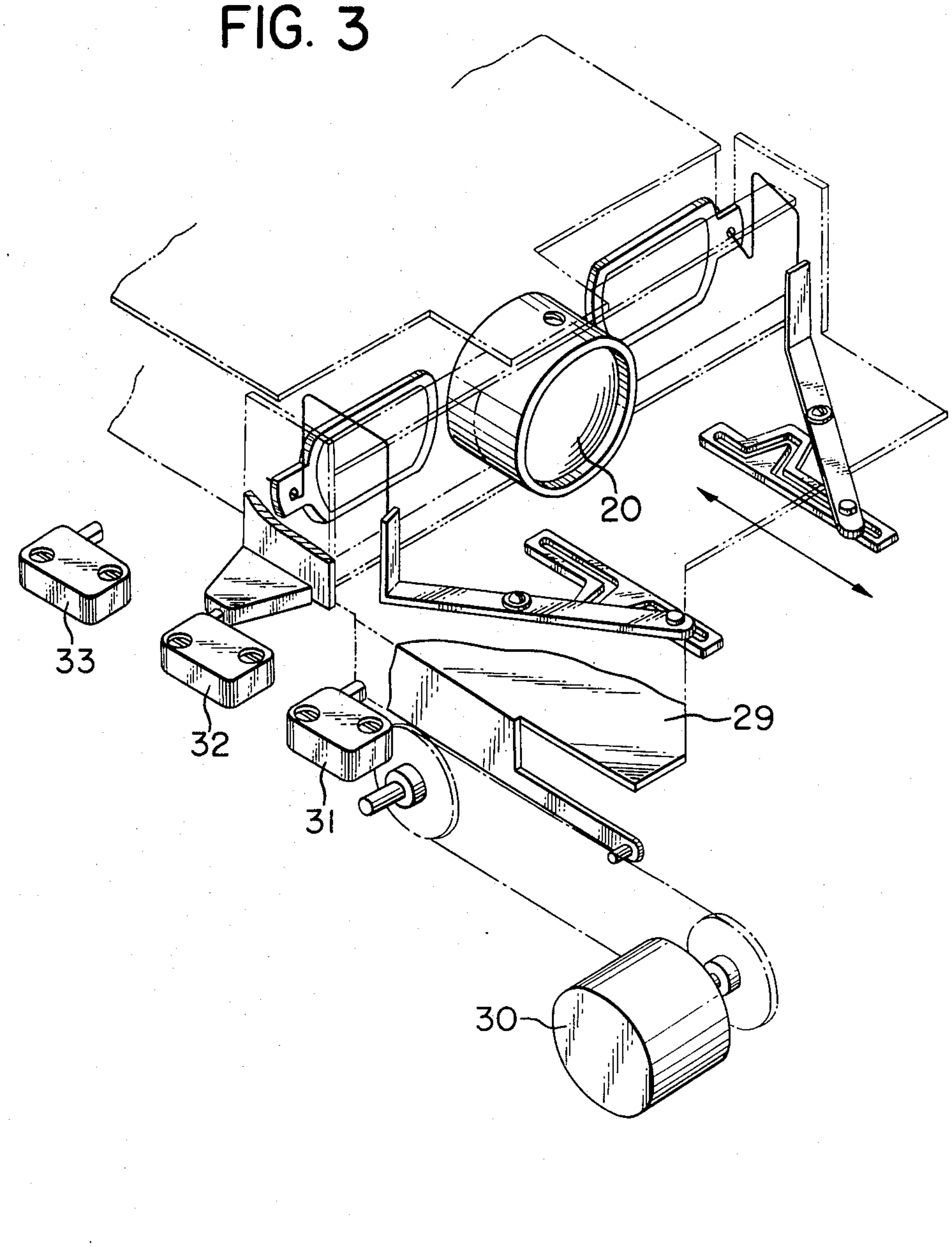
FIG. 3 is an elevated perspective view of the lens adjusting mechanism of the copying machine.

Needless to say, the incrementing of preset counters 34, 35, 36, 37 and 38 may be accomplished by input of pulses fed from the clock in a microcomputer, or alternatively from pulses generated by the slits of a slit plate 40 (FIG. 2) as detected by a photosensor 41.

In the embodiment of the invention disclosed in FIG. 4, forward scanning movement of optics unit 3 is stopped at the expiration of the maximum permissable period of time for its forward movement in accordance with the selected actuation mode, even if earlier than detection of the rear end of the sheet of transfer paper. As a consequence, larger than required sizes of transfer paper can be used without a corresponding need to increase the size of the copying machine.

Figure 5:
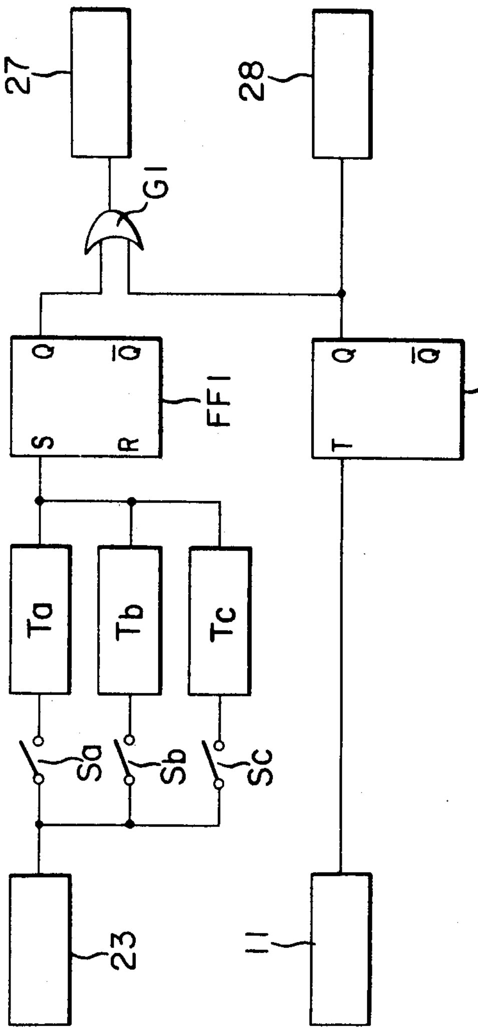
FIG. 5 is a block circuit diagram in accordance with a second example of the invention.

FIG. 5 illustrates a second example—a hardware embodiment—of the invention. As there shown, the output signal from paper feeding start detector 23 is applied to one of the timers Ta, Tb or Tc—each having a different actuation time and being enabled by its respective switch Sa, Sb or Sc in accordance with the selected actuation mode button. The output signals from timers Ta, Tb and Tc and the output signal from momentary-stop detector 11 are processed in flip-flops FF1 and FF2, respectively, and forward clutch 27 is disengaged by the output of NOR gate G1. The output signal of flip-flop FF2, actuated by momentary-stop detector 11, is applied to return clutch 28.

Figure 7:
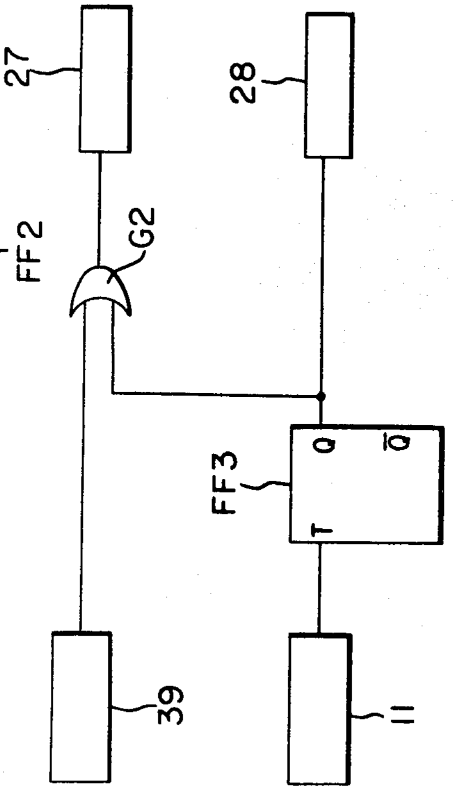
FIG. 7 is a block circuit diagram in accordance with said third example of the invention.
Figure 6:
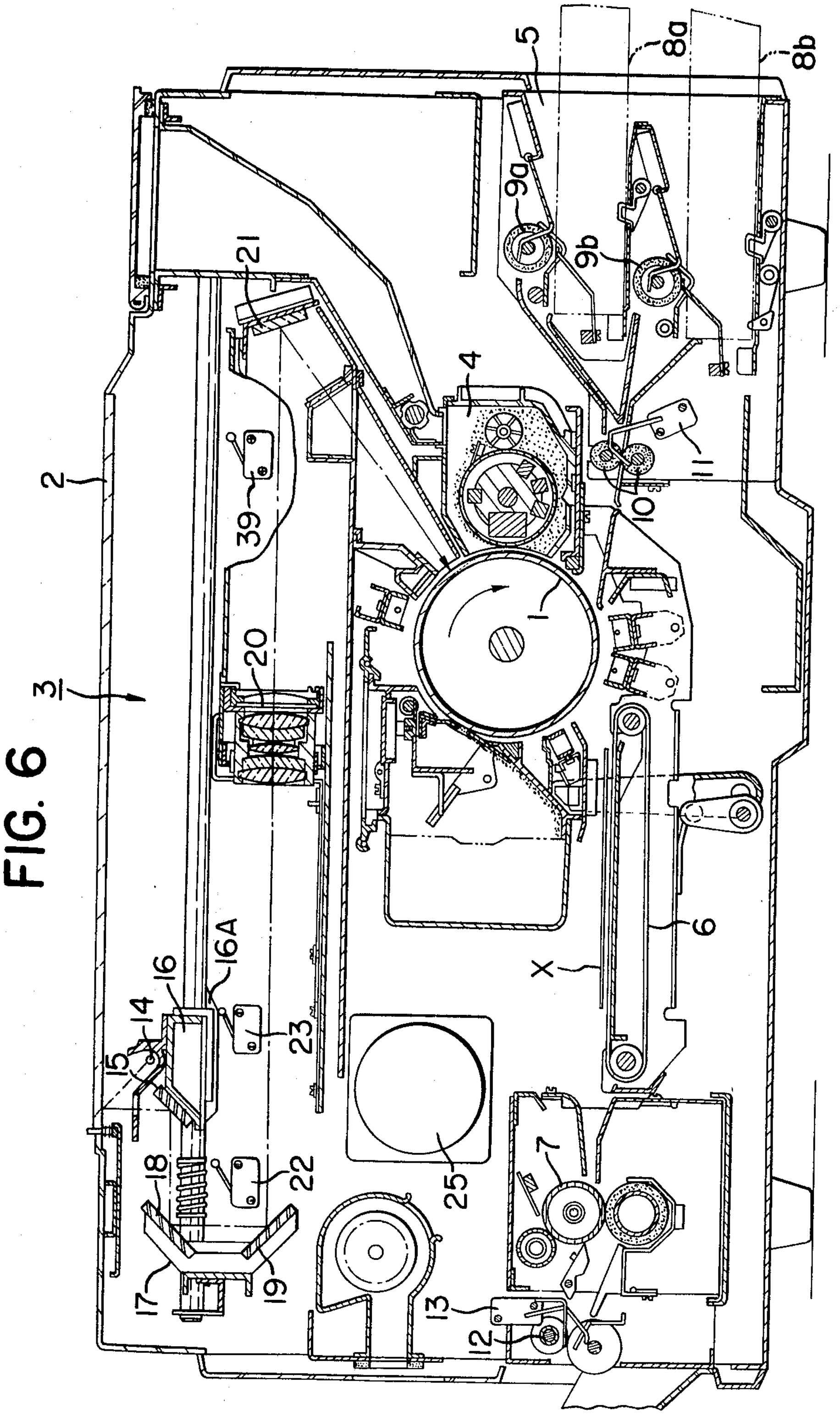
FIG. 6 is a cross-sectional view of a variable magnification type copying machine in accordance with a third example of the invention.

The third example, shown in FIGS. 6 and 7, further includes a limit switch 39 provided at the extreme point of forward movement of primary movable table 16 of optics unit 3. The output signals from both limit switch 39 and momentary-stop detector 11 are applied to NOR gate G2, and forward clutch 27 is disengaged by the output signal of NOR gate G2. Return clutch 28 is engaged by flip-flop FF3 which is actuated by momentary-stop detector 11.

As should be obvious from the foregoing explanation, the present invention provides not only the advantage that reciprocating movement of the scanning optics unit is controlled by transfer sheet trailing edge detection signals, but also assures that the distance of forward optics unit movement or travel is no longer than necessary. The invention accordingly enables minimizing of the overall dimensions of copying machines, the use of unusually large-size copy sheets, and prevents overstrain on the driving mechanism should transfer paper become jammed in the machine.

What is claimed is:

1. In a variable magnification copying machine which includes means for operator selection of a predetermined magnification ratio, a path along which copy sheets for receiving and retaining a predeterminately magnified copy of the original are operatively transported, and bidirectionally movable means for scanning an original to be copied and movable between an initial position and a limit position, forward clutch means engageable with said scanning means to cause movement of the scanning means in a first direction from its initial position for scanning of the original to be copied;

return clutch means engageable with said scanning means to cause movement thereof in a second direction opposite said first direction of scanning means movement to return the scanning means to its initial position;

means in the sheet path for detecting the trailing edge of a sheet transported along the path, said detecting means being connected to said forward clutch means to disengage the same from said scanning means, and being further connected to said return clutch means to engage the same with said scanning means, both upon detection of the trailing edge of a sheet transported along the path; and means connected to the operator selection means and presettable in accordance with the predetermined magnification ratio for causing disengagement of said forward clutch means from the scanning means when the scanning means in moving in said first direction reaches a position of maximum forward travel preset in accordance with the predetermined magnification ratio selected by an operator;

such that when a copy sheet larger than that normally utilized for receiving a copy of the original at an operator selected magnification ratio is transported along the sheet path, forward movement of the scanning means in said first direction from its initial position is stopped by said presettable means prior to detection of the trailing edge of the sheet to thereby facilitate production of a copy of an original on a sheet larger than necessary to accomodate the copy, said presettable means causing forward movement of the scanning means to stop at a particular preset position dependent upon the magnification ratio selected by an operator, and return movement of the scanning means in said second direction being thereafter initiated by engagement of said reverse clutch means upon subsequent detection of the trailing edge of the copy sheet.

2. In a variable magnification copying machine in accordance with claim 1, said detecting means being disposed for additionally detecting the leading edge of a copy sheet transported along the path, and said presettable means comprising timing means presettable in accordance with the predetermined magnification ratio for causing disengagement of said forward clutch means from the scanning means at a preset time following detection of the leading edge of the copy sheet in the path, said preset time corresponding to the period required for the scanning means to move from its initial position to said preset position of maximum forward travel.

3. In a variable magnification copying machine in accordance with claim 1, switch means for detecting movement of the scanning means to its limit position and connected to said forward clutch means to disengage said forward clutch means from the scanning means when the scanning means reaches its limit position.

4. In a variable magnification copying machine in accordance with claim 1 wherein the scanning means includes a primary movable table comprising a projection lamp and a mirror, a secondary movable table movable table for synchronous movement with and at one-half the moving speed of the primary movable table.

5. In a variable magnification copying machine in accordance with claim 4, wherein the primary and secondary movable tables are reciprocated by a driving drum driven by driving means through the medium of a connecting member.

6. In a variable magnification copying machine in accordance with claim 5, wherein said forward and return clutch means are interposingly disposed between said driving drum and said connecting member.

* * * * *